United States Patent
Olszewski et al.

(10) Patent No.: US 7,140,967 B2
(45) Date of Patent: Nov. 28, 2006

(54) DISPLACEMENT JOINT

(75) Inventors: Piotr Olszewski, Haguenau (FR);
Siegfried Tisch, Gerlingen (DE);
Martin Kruppa, Herzogenaurach (DE);
Wolfgang Fugel, Nürnberg (DE)

(73) Assignee: INA-Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/452,841

(22) Filed: Jun. 2, 2003

(65) Prior Publication Data

US 2004/0038742 A1    Feb. 26, 2004

Related U.S. Application Data

(63) Continuation of application No. PCT/EP01/13908, filed on Nov. 28, 2001, now abandoned.

(30) Foreign Application Priority Data

Dec. 2, 2000  (DE)  ............... 100 59 962
Dec. 2, 2000  (DE)  ............... 100 59 999
Dec. 2, 2000  (DE)  ............... 100 60 001

(51) Int. Cl.
*F16D 3/205*    (2006.01)

(52) U.S. Cl. ........................ 464/111; 464/905

(58) Field of Classification Search ............... 464/111, 464/132, 167, 905; 384/51
See application file for complete search history.

(56) References Cited

U.S. PATENT DOCUMENTS

| 2,400,374 | A |   | 5/1946  | Selnes |
|-----------|---|---|---------|--------|
| 3,545,716 | A |   | 12/1970 | Colautti |
| 4,408,806 | A |   | 10/1983 | Orain |
| 4,490,126 | A | * | 12/1984 | Orain .................. 464/111 |
| 4,619,628 | A | * | 10/1986 | Orain .................. 464/111 |
| 4,684,356 | A |   | 8/1987  | Kimata et al. |
| 4,708,693 | A | * | 11/1987 | Orain .................. 464/111 |
| 4,776,707 | A | * | 10/1988 | Olschewski et al. ...... 384/51 |
| 4,828,534 | A |   | 5/1989  | Orain |
| 5,160,298 | A |   | 11/1992 | Schneider |
| 5,209,700 | A | * | 5/1993  | Bensinger et al. ...... 464/111 |

FOREIGN PATENT DOCUMENTS

| DE | 31 05 632 | 2/1982 |
| DE | 34 40 105 | 5/1985 |
| DE | 35 44 919 | 6/1987 |
| DE | 41 10 311 | 10/1991 |
| EP | 0 206 886 | 12/1986 |
| JP | 63-43028  | 2/1988 |

* cited by examiner

*Primary Examiner*—Greg Binda
(74) *Attorney, Agent, or Firm*—Henry M. Feiereisen

(57) ABSTRACT

A displacement joint includes an outer joint part having circumferentially spaced recesses to form tracks. A tripod is mounted in fixed rotative engagement to a driveshaft and includes a tripod spider which has spherical arms spaced circumferentially in symmetric disposition for engaging the recesses. Roller bearing assemblies are fitted in the outer joint part to support the tripod arms, with each tripod arm guided by two roller bearing assemblies. Each roller bearing assembly has a bearing shell, which receives the tripod arm, rolling members fitted with clearance in a cage and disposed between the track of the outer joint part and a contact surface of the bearing shell. The cage is guided by shoulders of the outer joint part, which laterally bound the track, wherein the cage has opposite collars in parallel relationship to the shoulders for providing an axial stop for the rolling members and the bearing shell.

17 Claims, 10 Drawing Sheets

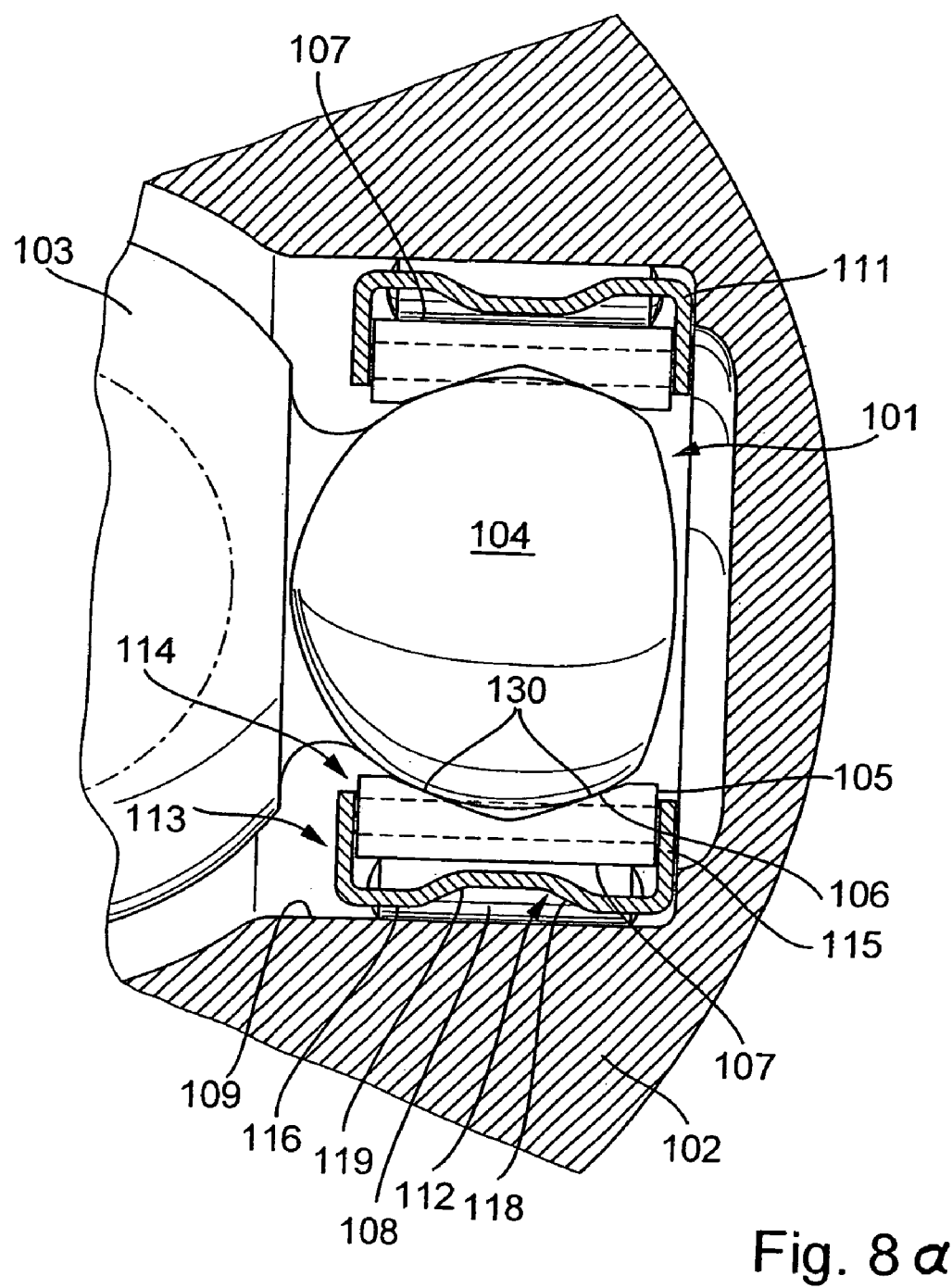
Fig. 8 α

DISPLACEMENT JOINT

CROSS-REFERENCES TO RELATED APPLICATIONS

This application is a continuation of PCT International application no. PCT/EP01/13908, filed Nov. 28, 2001, now abandoned, on which priority is claimed under 35 U.S.C. §120, the disclosure of which is hereby incorporated by reference.

This application claims the priority of German Patent Applications, Ser. Nos. 100 59 999.0, filed Dec. 2, 2000, 100 60 001.8, filed Dec. 2, 2000, and 100 59 962.1, filed Dec. 2, 2000, pursuant to 35 U.S.C. 119(a)–(d), the disclosure of which is incorporated herein by reference.

BACKGROUND OF THE INVENTION

The present invention relates, in general, to a constant velocity universal joint of the tripod type for installation in driveshafts of motor vehicles, and especially to a displacement joint for use in a constant velocity universal joint. More particularly, the present invention is directed to a configuration of roller bearing assemblies used in constant velocity universal joints.

Typically, a constant-velocity universal joint of a tripod type is arranged in an outer joint part, normally bell-shaped, and includes a tripod mounted in fixed rotative engagement to a driveshaft and having a tripod spider provided with symmetrically distributed spherical tripod arms. Each tripod arm is supported on roller bearing assemblies for slideably guiding the joint in recesses of the outer joint part. Each roller bearing assembly includes a bearing shell which is supported by the spherical arm of the tripod spider. In constant velocity universal joints of this type, the components within the joint for executing the angular and translational motions of the joint are separated from another. At a transitional movement, as encountered during operation of the driveshaft at a diffraction angle, the sliding friction is replaced by a combined sliding and rolling friction or rolling friction. At the same time, the axial force required for implementing a shift of the joint decreases.

German Pat. No. DE 34 40 105 C2 describes a constant velocity universal joint having a roller bearing assembly including a bearing shell which is supported on the spherical arm of the tripod spider via a ball socket. The rolling members are configured as needles and disposed between the bearing shell and a track provided in the outer joint part. Contacting rolling members are placed in a cage which has collars of half-round configuration along the longitudinal sides, whereby terminal conical projections of the rolling members engage in the collars. A positioning device in the form of a H-shaped needle spring is arranged in parallel relationship to the plane of the rolling members and disposed between the bearing shell and a terminal end of the rolling member cage for acting upon the cage and thus for centering the rolling members in relation to the bearing shell. The positioning device is provided to support the bearing shell independently from the diffraction angle of the driveshaft over the entire width of the rolling members so as to establish a substantially constant load or surface pressure between these components.

This conventional constant velocity universal joint has many shortcomings. The respective conical end surfaces of the rolling members cause increased manufacturing costs and their installation is complicated. Moreover, the neighboring, contacting rolling members, configured as needles, in the cage cause increased friction as a result of the fully needled arrangement, accompanied by an increased axial force which also adversely affects the noise development.

It would therefore be desirable and advantageous to provide an improved displacement joint for a constant velocity universal joint, which obviates prior art shortcomings and which is so configured as to realize an optimum support of the bearing shell on rolling members while still being easy to install and allowing the use of conventional rolling members.

SUMMARY OF THE INVENTION

According to one aspect of the present invention, a displacement joint, in particular for a constant velocity universal joint, includes an outer joint part having circumferentially spaced recesses to form tracks, a tripod mounted in fixed rotative engagement to a driveshaft and including a tripod spider which has spherical tripod arms spaced circumferentially in symmetric disposition for engagement in the recesses, and roller bearing assemblies fitted in the outer joint part for support of the tripod arms, with each tripod arm being guided by two of the roller bearing assemblies, each of which having a bearing shell, which receives the tripod arm, rolling members, which are fitted with clearance in a cage and disposed between the track of the outer joint part and a contact surface of the bearing shell, wherein the cage is guided by shoulders of the outer joint part, which laterally bound the track, wherein the cage has opposite collars in parallel relationship to the shoulders for providing an axial stop for the rolling members and the bearing shell, and a positioning device provided between the bearing shell and the cage for centering the rolling members in relation to the bearing shell.

The present invention resolves prior art problems by configuring each of the two roller bearing assemblies, assigned to a tripod arm, with a bearing shell which is guided upon the arm of the tripod spider but is not fixed in place. The rolling members of the roller bearing assembly are hereby captivated in the cage with clearance, whereby the cage is guided by the wall surfaces of the recesses in the outer joint part. The cage assumes a further function relating to a lateral guidance for the bearing shell. Thus, the movement of the bearing shell is limited exclusively to a longitudinal motion in the direction of the recesses. Compared to a tripod roller unit, the displacement joint according to the invention has a smaller transfer play, i.e. shocks caused by a change of load from traction to thrust or vice versa, are precluded. Moreover, the displacement joint according to the invention exhibits a reduced noise vibration hardness (NVH) and improved agility.

At a diffraction angle of the driveshaft, the arm of the tripod spider shifts within the bearing shell, i.e. in the direction of a longitudinal axis of the rolling members. This movement of the tripod arm may occur in synchronism to a displacement of the roller bearing assemblies in the recesses of the outer joint part. The inventive and novel configuration of the roller bearing assembly ensures a desired unchanged support across a large area of the entire bearing shell on the rolling members. This has a positive effect on the friction behavior as well as on the noise development.

The provision of the positioning device to center the rolling members in relation to the bearing shell provides an automatic alignment of the roller bearing assembly in the operative position, i.e. even when the driveshaft rotates, so that the bearing shell can be sufficiently supported at all times on the rolling members and an impact of the bearing shell with its end upon the cage is prevented.

According to another feature of the present invention, the cage, the rolling members, the bearing shell and the positioning device of the roller bearing assembly may be combined and captivated to form a unitary structure, whereby the rolling members are held with clearance and the bearing shell is laterally guided. Moreover, the pre-assembled structure includes also the positioning device. The bearing shell may have a substantially half-round configuration with a receptacle configured to complement a contour of the tripod arm and extending transversely at a right angle to the longitudinal axis, for allowing a movement of the tripod arm relative to the bearing shell along the receptacle. The receptacle has a radius which is conformed to the outer spherical surface area of the tripod arm connected to the tripod spider and thus corresponds to the radius of the arm. In contrast to conventional displacement joints, the bearing shell in accordance with the present invention is not supported in form-fitting manner on the tripod arm but a relative movement of the arm is possible in relation to the bearing shell along the receptacle.

In order to reduce manufacturing costs, the cage may be configured as a sheet metal element and made without material removal, especially through a deep-drawing process. The cage has hereby a substantially U-shaped configuration with parallel collars for guiding the bearing shell and the rolling members in different levels. The cage is provided with pockets between the collars for receiving the rolling members, with neighboring pockets being separated from one another by webs. The webs are spaced from one another at a distance which is smaller than a diameter of the rolling members to ensure a slight overlapping disposition of the webs with respect to the rolling members. In this way, the rolling members can be installed as a result of the inherent elasticity of the cage and captivated therein.

According to another feature of the present invention, the webs of the cage may be formed in a central area with a recessed zone toward the bearing shell, with the recessed zone extending beyond a midsection of the rolling members and configured so as to establish between the webs an axial distance which is smaller than a diameter of the rolling members. In this way, the rolling members are securely fixed in the cage.

According to another feature of the present invention, the cage has opposite ends, whereby each end may be provided with a longitudinal stop arranged at a right angle to the collars. These longitudinal stops form an end stop for the bearing shell and for arrangement and securement of the positioning device.

According to another feature of the present invention, the contact surface of the bearing shell may be planar and have a rectangular or square configuration, whereby the bearing shell tapers from the contact surface in the direction of the tripod arm on all sides and is supported with a half-round receptacle on the side distal to the contact surface by the spherical arm of the tripod spider. The bearing shell in accordance with the present invention simplifies the assembly of the displacement joint upon the tripod arm.

According to another feature of the present invention, the positioning device may have a single-part or multi-part spring member for force-fitting and/or form-fitting engagement between the cage and the bearing shell. In this way, the spring member acts in both adjustment directions of the roller bearing assembly between the bearing shell and the cage. Support of the spring member may involve the use of the longitudinal stops of the cage, regardless whether the spring member is of single-piece configuration or includes two springs. When a single-piece spring member is involved, a central zone of the spring member may be configured to engage in a continuous groove of the bearing shell and thus is held in a form-fitting manner. Suitably, the spring member may be guided at least on one collar of the cage to optimize the guidance.

Further embodiments of the positioning device may include a configuration as compression springs or tension springs. Hereby, the spring member may be constructed in horizontal parallel relationship to the rolling members and laterally guided on at least one of the collars extending in longitudinal direction, in order to optimize the assembly position, i.e. to realize a secure, clearance-free installation without causing undesired noise generation.

According to another feature of the present invention, the bearing shell may be configured as an extrusion part. Such a bearing shell complies with all demands relating to strength and can be manufactured in an inexpensive way on a large scale while still maintaining positional and manufacturing tolerances.

According to another aspect of the present invention, a displacement joint, in particular for a constant velocity universal joint, includes an outer joint part having circumferentially spaced recesses to form tracks, a tripod mounted in fixed rotative engagement to a driveshaft and including a tripod spider which has spherical tripod arms spaced circumferentially in symmetric disposition for engagement in the recesses, and roller bearing assemblies fitted in the outer joint part for support of the arms, with each tripod arm being guided by two roller bearing assemblies in parallel tracks, each of the roller bearing assemblies having a bearing shell, which receives the tripod arm, a cap-shaped receptacle for the tripod arm, rolling members disposed between the track of the outer joint part and an outer side of the bearing shell, a cage having a trough-shaped configuration and made through a process without material removal for the rolling members and the bearing shell, and a positioning device for the bearing shell.

The bearing shell is hereby guided on the longitudinal walls of the cage with clearance, while the transverse walls of the trough-shaped cage form the positioning device which ensures a forced engagement of the arm on the bearing shell, even when the displacement joint is not exposed to a load, and prevents a loose bearing shell arrangement that could cause noise. In addition, the positioning device ensures an effective captivation of the bearing shell.

The cap-shaped receptacle in the bearing shell for the arm of the tripod spider realizes a form-fitting attachment of the roller bearing assembly and thus of the displacement joint upon the tripod spider. This attachment results continuously in a central force introduction into the bearing shell and ultimately into the rolling members so as to prevent the undesired edging. Thus, the service life of the roller bearing assembly is extended.

According to another feature of the present invention, the arm of the tripod spider is supported via a circular ring shaped contact surface in the bearing shell. This configuration enhances the force introduction and prevents excess strain on the interacting components. The circular ring shaped contact surface also positively affects the support height, when the bearing shell and thus the roller bearing assembly moves as a consequence of a changing number of supporting rolling members and deformation impacts of the rolling members entering the load zone. A periodically changing support height adversely affects the true running of the tripod spider and thus the oscillation behavior of the driveshaft, which influences wear of the joint and noise generation. By configuring the contact surface between the arm and the bearing shell in a circular ring shaped manner, this drawback is eliminated so that the true running is improved and the noise behavior is optimized.

According to another feature of the present invention, each of the roller bearing assemblies is guided in the track of the outer joint part, with the track being bounded in axial direction on an outer side by a shoulder and configured, without steps, on an inner side in a direction toward a center of the tripod spider. In this way, an unhindered free displacement of the roller bearing assembly is promoted in accordance with the adjustment movement of the tripod arm.

Suitably, the rolling members, the cage, the bearing shell and the positioning device are combined to form a unitary structure.

According to another feature of the present invention, the bearing shell may be supported by the rolling members via a rectangular or square planar contact surface and tapers from the contact surface on all sides for formation of a truncated cone or truncated pyramid having a cap-shaped receptacle for the arm at a location distal to the contact surface.

According to another feature of the present invention, the rolling members may be placed in axial spaced-apart relationship in the cage, whereby the cage may be made through a deep-drawing process or other non-cutting process for allowing a manufacture of cages on a large scale. The cage may have pockets, separated by webs, for receiving the rolling members. Suitably, the pockets may be formed through punching and are laterally bounded by the webs. An establishing axial distance between the webs on the cage side facing the outer joint part results in an overlap of the rolling members, i.e. the axial distance between the webs is smaller than the diameter of the rolling members. In this way, the rolling members are captivated in the cage. In order to increase the carrying number of the roller bearing assembly, a fully rolling roller bearing assembly can be used in which the rolling members are arranged in immediate neighboring relationship so that the number of rolling members to be received in the cage can be increased.

According to another feature of the present invention, the webs of the cage may bee formed in a central area with a recessed zone toward the bearing shell, whereby the recessed zone extends beyond a midsection of the rolling members and is configured so as to establish between the webs an axial distance which is smaller than the diameter of the rolling members. In this way, the rolling members are effectively captivated also in the direction of the bearing shell and the guided in the cage.

As an alternative or in addition to the provision of the recessed zone, the cage bottom may have at least one embossment or fold extending over an entire length of the cage to thereby interconnect the transverse walls of the cage. The embossment or fold may be provided twice, i.e. disposed in the cage bottom in parallel relationship. The embossment may be arranged in both directions, i.e. inwards as well as outwards toward the cage bottom, and exhibits also a stiffening effect of the trough-shaped cage. The embossment or fold is also provided with pockets for receiving the rolling members and has an opening measure which is smaller than the respective diameter of the rolling members. This ensures a captivation of the rolling members even when the cage is provided with an embossment.

According to another feature of the present invention, the positioning device may have a spring member in immediate connection with the roller bearing assembly, with the spring member arranged in forced engagement with an end surface of the bearing shell. Regardless of the direction of the adjusting movement of the bearing shell, the spring member forces the bearing shell to assume a central disposition. The spring member may be realized by providing the transverse wall of the cage in single-piece configuration with the spring legs which enable double-stepped support. The spring member applies initially a small force, when slightly shifted off-center. The force increases as soon as the bearing shell shifts in the direction of the transverse wall. Suitably, the transverse wall of the cage may be configured with two spring legs of different length which are angled differently from one another in the direction of the bearing shell. The free end of the longer spring leg is hereby supported directly on the end surface of the bearing shell. The action of the other spring leg becomes effective only when the bearing shell exceeds a certain adjusting path so that both spring legs contact one another.

The spring member may also be implemented by providing the transverse wall of the cage with a multiply angled and/or wound spring leg having a rounded end portion for support against the end surface of the bearing shell. As the bearing shell undergoes an adjusting movement in the direction of the transverse wall, the spring member is shifted at the same time in the direction of a rigid stop of the cage wall. As soon as the spring end bears upon the edge or stop of the transverse wall, the force impact is increased.

The spring member may also be realized by a single-piece torsion spring which is secured to the bearing shell in a force-fitting and/or form-fitting manner and has spring ends for support against the transverse wall of the cage. Such a torsion spring has improved fatigue strength so as to extend the service life of the spring member.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 8*a* is a fragmentary, partly sectional view of a modification of the displacement joint of FIG. 8;

FIG. 8*b* is a fraumentary, partly sectional view of another modification of the displacement joint of FIG. 8;

DETAILED DESCRIPTION OF PREFERRED EMBODIMENTS

Figure 1:
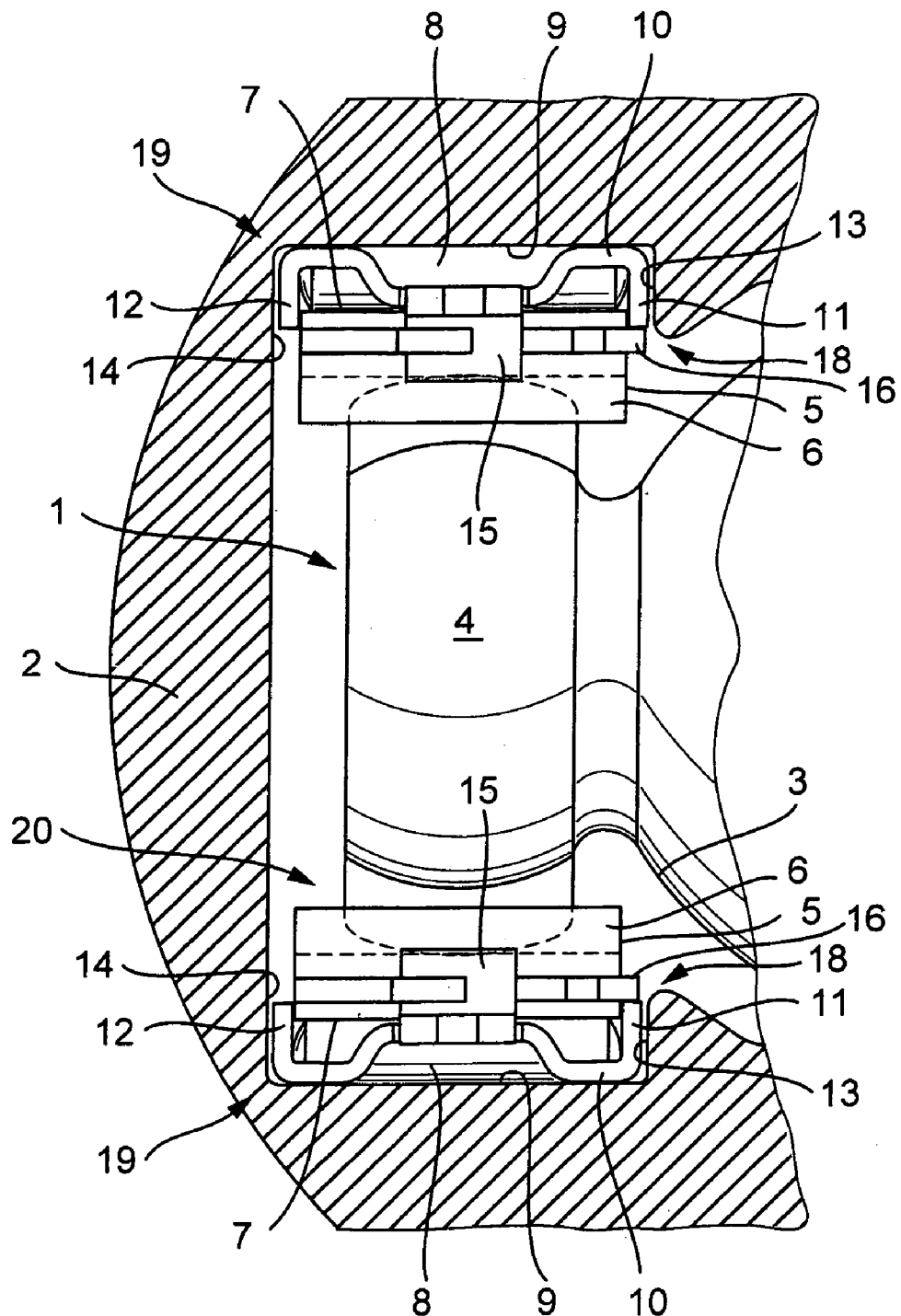
FIG. 1 is a fragmentary, partly sectional view of a first embodiment of a displacement joint according to the present invention in installed state.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a fragmentary, partly sectional view of a first embodiment of a displacement joint according to the present invention, generally designated by reference numeral 20, for installation in a constant velocity universal joint, generally designated by reference numeral 1 and including an outer joint part 2. Accommodated in the outer joint part 2 is a tripod which is connected in fixed rotative engagement with a driveshaft. The tripod includes a tripod spider 3 which has three radial tripod arms 4 circumferentially distributed at equal angular distances. Each tripod arm 4 has a spherical convex outer contour for support of two opposite bearing shells 5 of respective roller bearing assemblies, generally designated by reference numeral 19. Each bearing shell 5 has a half-round receptacle 6 to conform to the outer contour of the tripod arm 4 and is supported on the outside, i.e. on the side distal to the tripod arm 4, via a contact surface 7 on rolling members 8 which are guided in a track 9 of the outer joint part 2. The rolling members 8, arranged in axial spaced-apart relationship, are received in a substantially U-shaped cage 10 which includes lateral collars 11, 12 extending in longitudinal direction for providing a lateral guidance of the rolling members 8 as well as of the bearing shell 5. The collars 11, 12 are guided on shoulders 13, 14 of the outer joint part 2 to laterally demarcate the track 9.

The cage 10 has opposite end surfaces provided with a longitudinal stop 15 to form an end stop for the bearing shell 5 and to provide a securement of a spring end 17 of a spring member 16 which may be configured as a compression spring or a tension spring. The spring member 16 is further supported or secured on the bearing shell 5 and assumes the function of a positioning device, generally designated by reference numeral 18, for effecting an automatic tracking of the rolling members 8 in relation to the bearing shell 5 as soon as the tripod arm 4 moves in longitudinal direction in the outer joint part 2. Rolling members 8, cage 10, bearing shell 5 as well as positioning device 18 form together a roller bearing assembly 19. Suitably, these components of the roller bearing assembly 19 are combined to a unitary structure in which the components are captivated, for example through appropriate shaping of the cage 10 and/or the spring member 16. The roller bearing assembly 19 in combination with the tripod arm 4 defines the displacement joint, generally designated by reference numeral 20.

Figure 2:
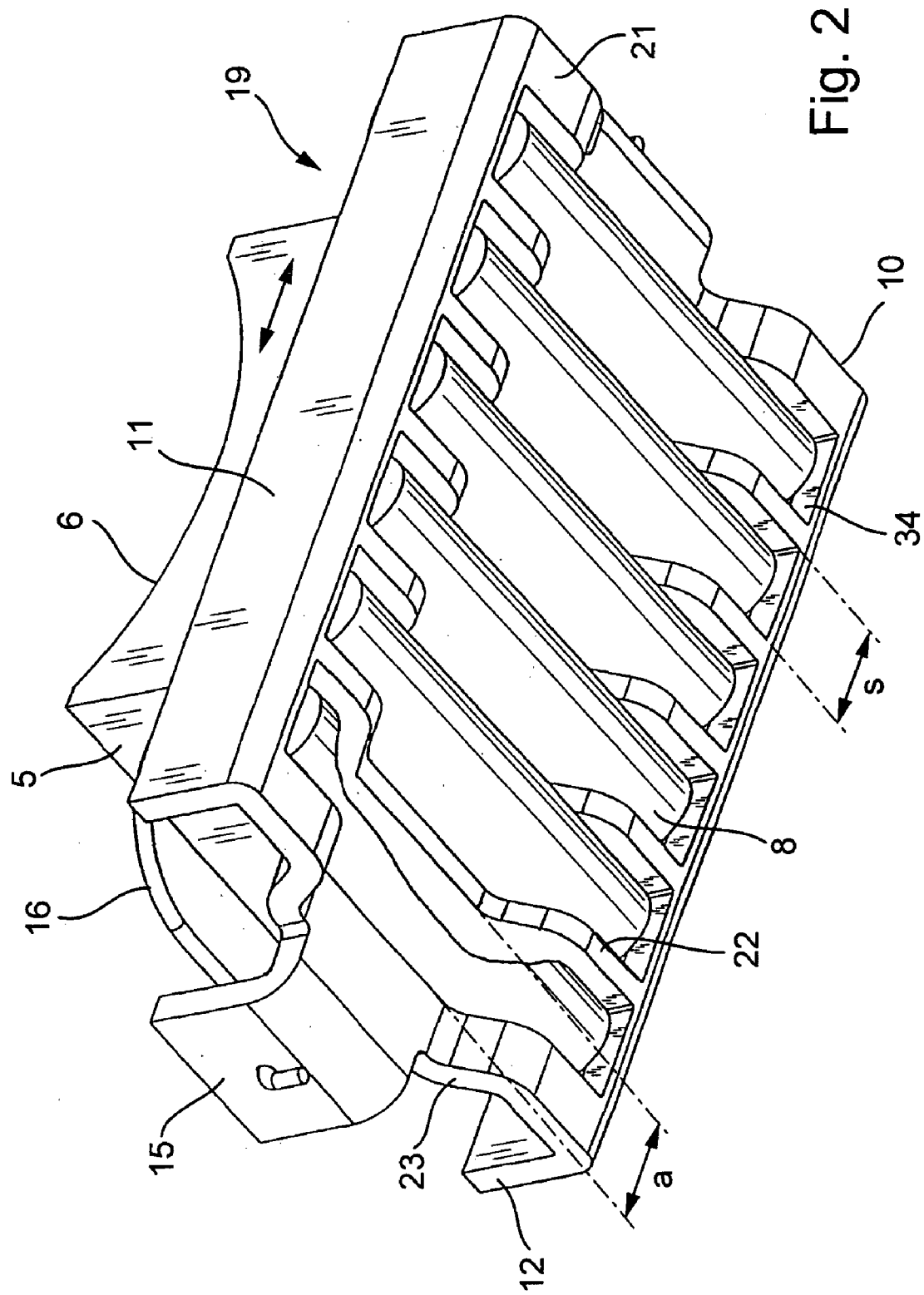
FIG. 2 is a perspective view of a roller bearing assembly of the displacement joint.

FIG. 2 shows a perspective view of the roller bearing assembly 19. As can be seen in FIG. 2, the cage 10 has a bottom 21 formed with pockets 34 for receiving the rolling members 8. In order to realize an axial spaced-apart disposition of the rolling members 8, the pockets 34 are separated from one another by webs 22. The axial distance "s" between the webs 22 is hereby slightly smaller than the diameter of the needle-like rolling members 8 so as to captivate the rolling members 8 in the cage 10. The elastic property of the webs 22 enables an installation of the rolling members 8 in the pockets 34. Each web 22 is formed in midsection with a recessed area 23 which faces away from the cage bottom 21 and extends beyond the middle of the rolling members 8. In the recessed area 23, the webs 22 are spaced from one another by an axial distance "a" which is also smaller than the diameter of the rolling members 8 to effect a secure fixation of the rolling members 8. The bearing shell, which is movable relative to the cage 10 and the rolling members 8, as indicated by the double arrow, is guided on the side by the collars 11, 12. The bearing shell 5 is maintained in a central position by the positioning device 18, configured as spring member 16 between the longitudinal stop 15 and the bearing shell 5, with the spring member 16 interacting with the further longitudinal stop 15, not shown in FIG. 2.

FIGS. 3 to 7 show various views and embodiments of a roller bearing assembly 19, whereby parts corresponding with those in FIG. 1 are generally denoted by identical reference numerals and not explained again.

Figure 3:
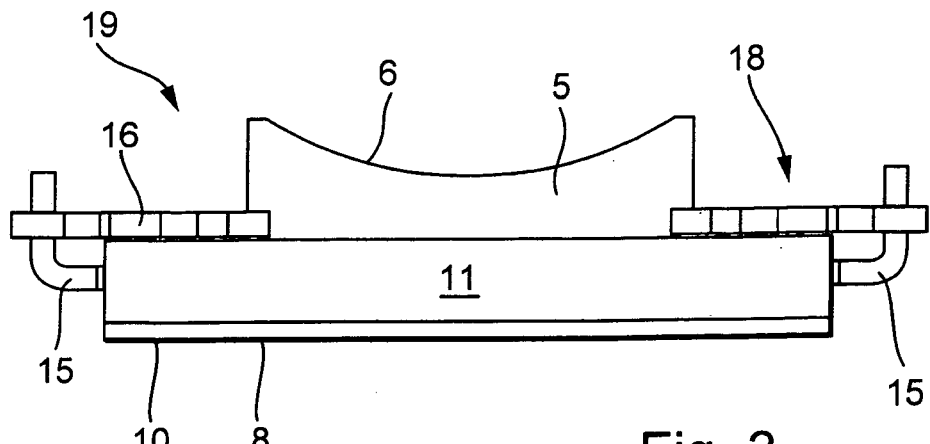
FIG. 3 is a front view of the roller bearing assembly.
Figure 4:
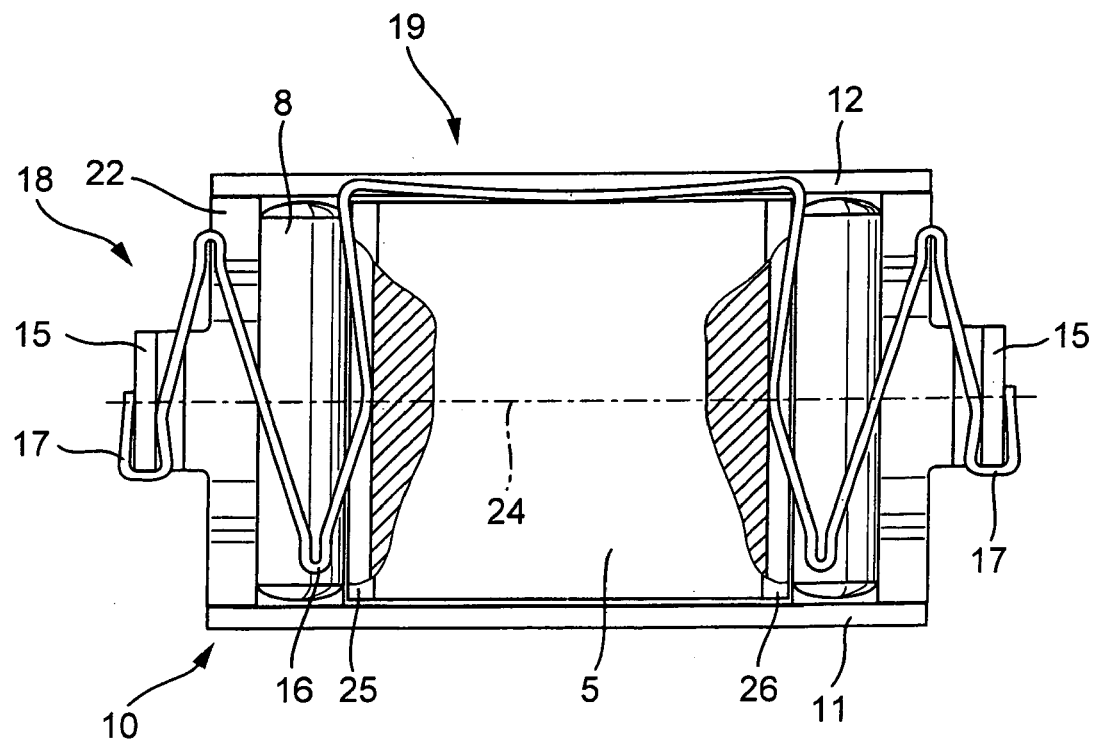
FIG. 4 is a plan view of the roller bearing assembly.

FIGS. 3 and 4 show a roller bearing assembly 19 with a single-piece spring member 16 which embraces the bearing shell 5 on three sides and is guided transversely to a longitudinal axis in longitudinal grooves 25, 26 of the bearing shell 5. The spring member 16 has U-shaped spring ends 17 which are secured in force-fitting manner upon the longitudinal stops 15 of the cage 10.

Figure 5:
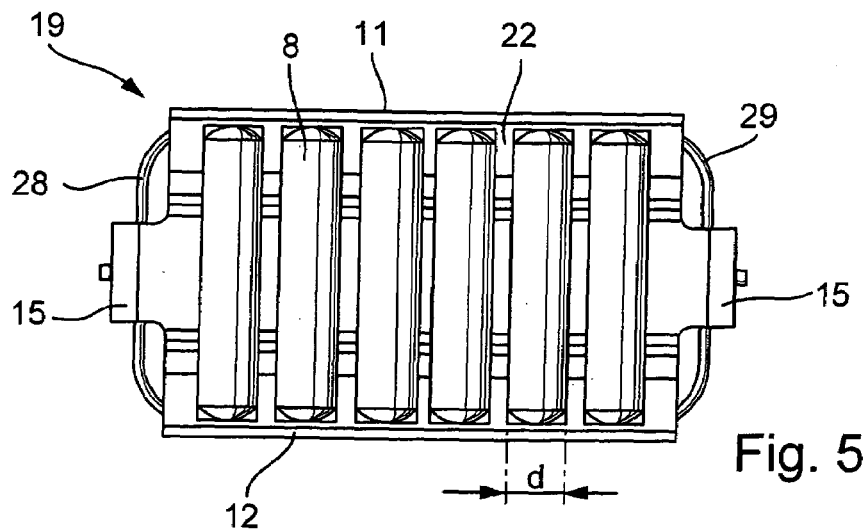
FIG. 5 is an illustration of the roller bearing assembly in the direction of the rolling members.
Figure 6:
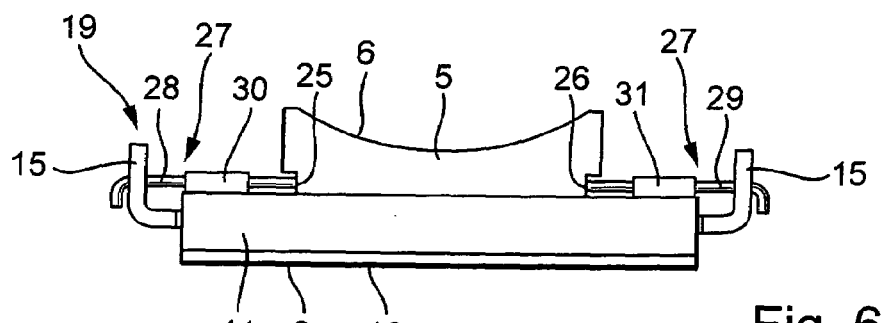
FIG. 6 is a front view of the roller bearing assembly of FIG. 5.
Figure 7:
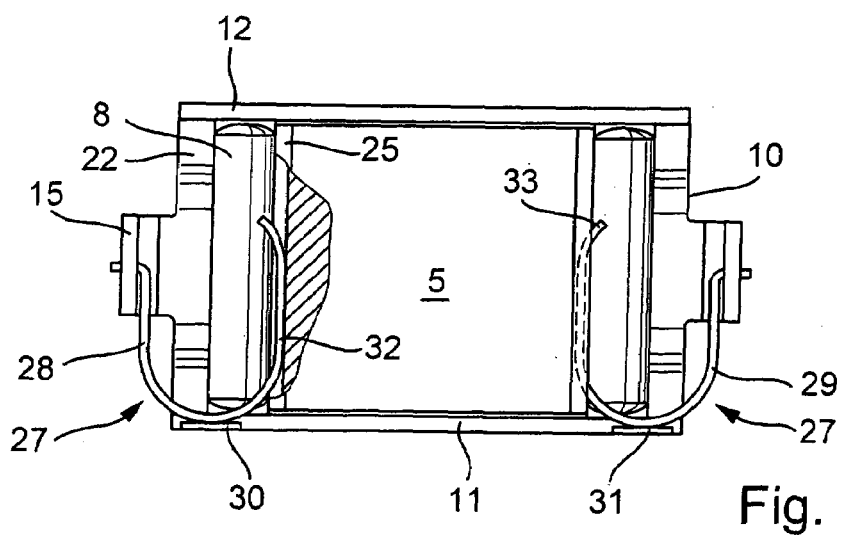
FIG. 7 is a plan view of the roller bearing assembly of FIG. 5.

FIGS. 5 to 7 show a roller bearing assembly 19 with a positioning device 27 having two separate spring members 28, 29 which are respectively disposed between the longitudinal stop 15 of the cage 10 and the bearing shell 5 and are made of spring wire. A clearance-free arrangement of the spring members 28, 29 is realized by guiding the spring members 28, 29 with a leg 32, 33 in the longitudinal grooves 25, 26 of the bearing shell 5. The spring members 28, 29 are guided laterally by providing the collar 11 of the cage 10 locally with radially pointing stops 30, 31 which prevent a shift of the spring members 28, 29 beyond the outer contour of the cage 10 and collar 11.

Figure 8:
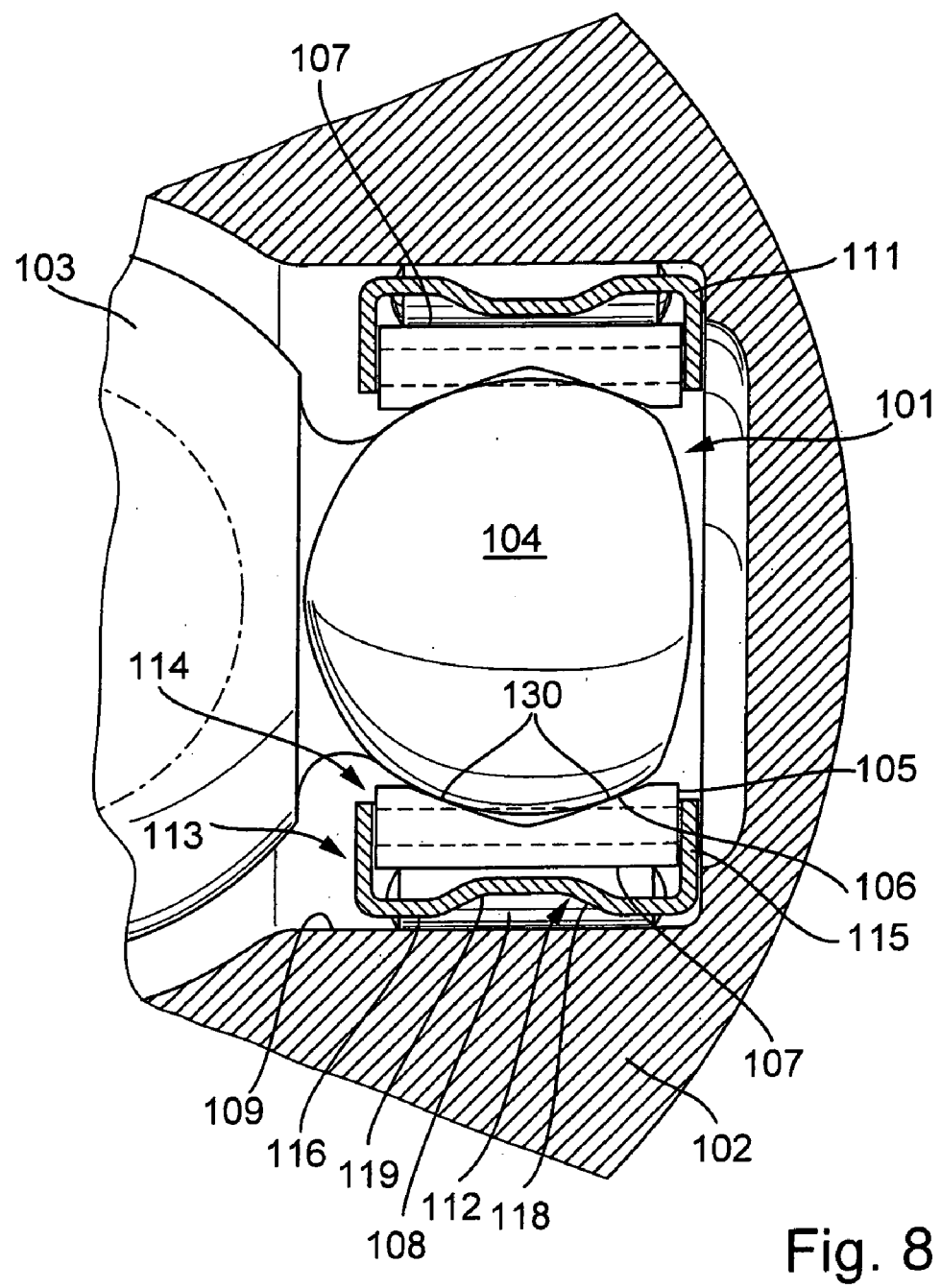
FIG. 8 is a fragmentary, partly sectional view of a second embodiment of a displacement joint according to the present invention in installed state.
Figure 8:
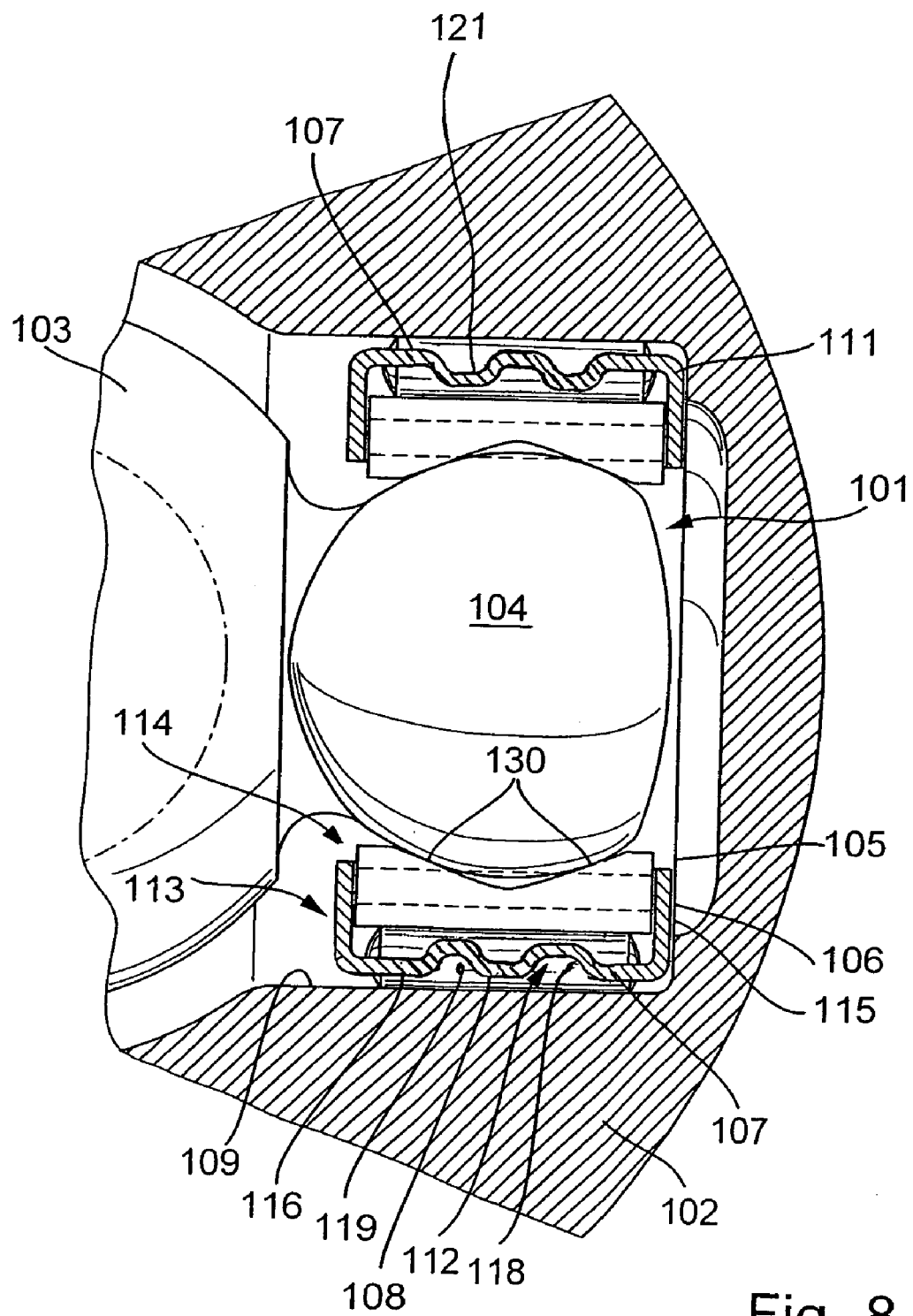

FIG. 8 shows a fragmentary, partly sectional view of a second embodiment of a displacement joint according to the present invention for a constant velocity universal joint, generally designated by reference numeral 101 and including an outer joint part 102 for accommodation of a tripod which is mounted in fixed rotative engagement with a driveshaft. In the following description, parts corresponding with those in FIG. 1 will be identified, as far as appropriate, by corresponding reference numerals each increased by "100". The tripod has a tripod spider 103 with three tripod arms 104 arranged in symmetric disposition. The spherical, convex outer contour of the tripod arm 104 engages form-fittingly in a receptacle 106 of the bearing shell 105 via a contact surface 130. As clearly shown in FIG. 8, the concavely designed receptacle 106 is not shaped complementarily to the convex outer contour of the tripod arm 104 but has an ogival configuration so as to establish a ring-shaped contact zone between the tripod arm 104 and the receptacle 106 of the bearing shell 105. This line contacting, ring-shaped force transmission between the tripod arm 104 and the bearing shell 105 is desired and has a positive effect during a movement of the roller bearing assembly 113.

Conventional displacement joints experience shortcomings because an alternation as a consequence of the number of load-bearing rolling members of the roller bearing assembly causes deformation shocks of the rolling members entering the load zone. The hereby encountered periodic change in the support height adversely affects the true running for the tripod spider and the oscillation behavior of the connected driveshaft, thereby increasing wear of the driveshaft and at the same time increasing the noise generation. The ring-shaped support of the tripod arm 104 on the bearing shell 105 in accordance with the present invention now eliminates this problem and improves the true running of the constant velocity universal joint 101 and reduces noise.

The bearing shell 105 is supported on the outside via the contact surface 107 by the rolling members 108 which are guided in a track 109 of the outer joint part 102. The track 109 is bounded on the outside by a wall or shoulder 111 and is configured on the inside without step in the direction of the tripod spider 103. Thus, the roller bearing assembly 113 is able to follow all adjustment motions of the tripod spider 103. The roller bearing assembly 113 includes a cage 112 for accommodating the rolling members 108 and the bearing shell 105 which is guided along the longitudinal walls 115 of the cage 112. Each tripod arm 104 is supported by two roller bearing assemblies 113, with the roller bearing assembly 113 defining with the tripod arm 104 a displacement joint, generally designated by reference numeral 114 and linearly moveable on the track 109 with little noise and little friction. The roller bearing assembly 113 thus enables an unobstructed drive, regardless of the diffraction angle of the driveshaft or an adjusting range of the tripod spider 103.

The cage 112 has a trough-shaped configuration and includes a cage bottom 116 which is formed with pockets 117 for receiving the rolling members 108. The cage 112 can be made through a process without material removal, e.g. a deep-drawing process. The pockets 117 are respectively separated by webs 118 and are formed in midsection of the cage bottom 116 with a recessed area 119 which extends in the direction of the bearing shell 105 beyond the middle of the rolling members 108. The webs 118 are spaced from one another in the recessed area 119 at an axial distance which, as shown in FIG. 9, is smaller than the diameter measure of the rolling members 108 to thereby secure the rolling members 108 in position.

As shown in FIG. 8*a*, the bearing shell 105 is supported by the rolling members 1–8 via a rectangular or square contact surface 130 and tapers from the contact surface 130 on all sides for formation of a truncated cone or truncated pyramid having a cap-shaped receptacle 106 for the tripod arm at a location distal to the contact surface 130.

Figure 9:
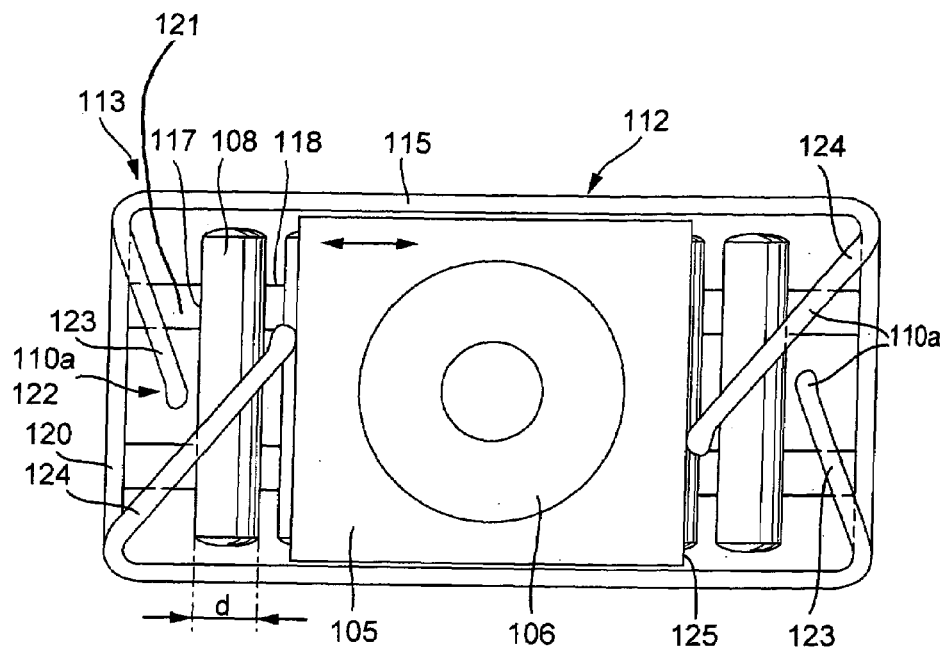
FIG. 9 is a plan view of a roller bearing assembly of the displacement joint of FIG. 8, with trough-shaped cage.

As shown in FIG. 9, the bearing shell 105 is moveable in a direction as indicated by the double arrow, and guided with clearance at the longitudinal walls 115 of the cage 112. To center the bearing shell 105, the roller bearing assembly 113 is provided with a positioning device 122 on both sides of the bearing shell 105. The positioning device 122 includes a spring member 110*a* which has spring legs 123, 124 and is in forced engagement with an end surface of the bearing shell to effect at least one two-stage force-fitting support of the bearing shell 105, regardless of a direction of movement of the bearing shell 105. The spring legs 123, 124 are connected in one piece with a transverse wall 120 of the cage 112 and are inwardly slantingly inclined in a same manner in the direction of the bearing shell 105. The longer spring leg 124 is supported in force-fitting manner on the end surface 125 of the bearing shell 105. As the bearing shell 105 moves in the direction of the transverse wall 120, the spring leg 124 exclusively applies initially a counterforce upon the bearing shell 105. As soon as the spring leg 124 contacts the spring leg 123, the force applied by the positioning device 124 and counteracting the movement of the bearing shell 105 is increased. The cage bottom 116 has at least one embossment 121 extending over an entire length of the cage and provided with pockets 117 for the rolling members 108. A specific example is shown in FIG. 8*b*, in which the cage bottom 116 has two embossments 121 in parallel relationship.

Figure 10:
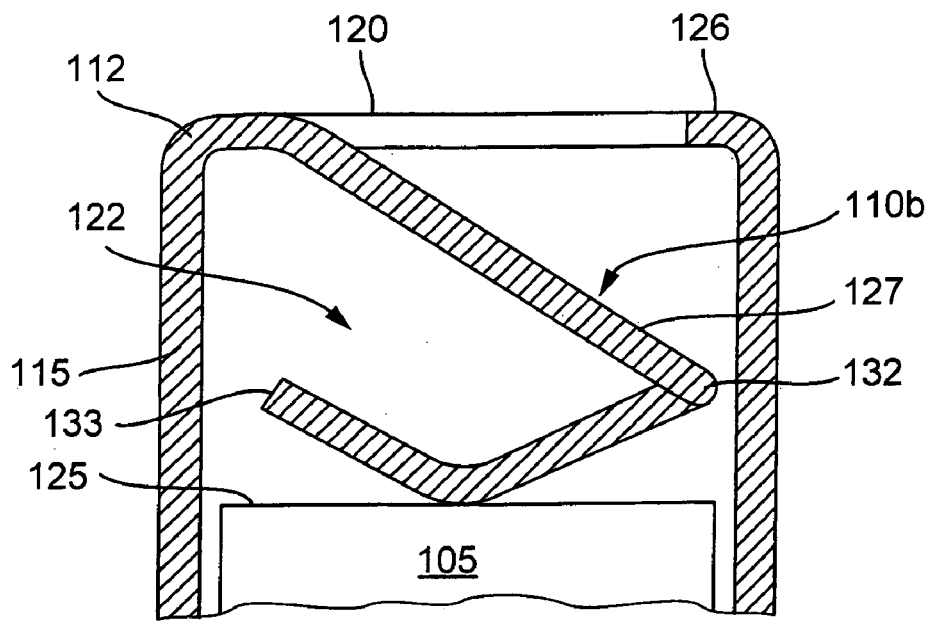
FIG. 10 is a detailed view, on an enlarged scale, of the trough-shaped cage with modified spring member.

FIGS. 10 to 13 show further variations of the positioning device 122. In FIG. 10, the transverse wall 120 of the cage 112 is provided with a spring member 110*b* having a multiply wound spring leg 127 which has a rounded end zone for support on the end surface 125 of the bearing shell 105. This configuration shows a three-stage positioning device 122. Starting from a first stage, the second stage is triggered as soon as an intermediate zone 132 has shifted to the edge 126. A further force reinforcement is implemented as soon as the free end 133 of the spring member 110*b* reaches the inside of the transverse wall 120.

Figure 11:
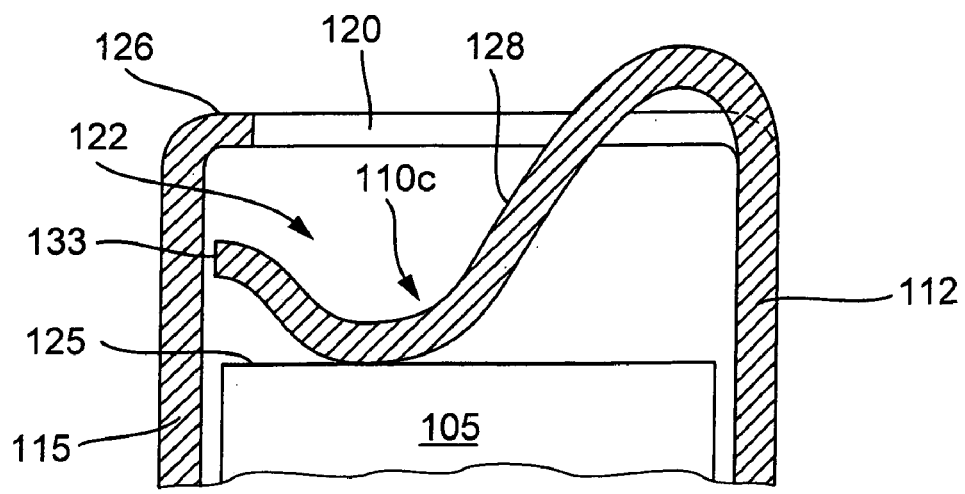
FIG. 11 is a detailed view, on an enlarged scale, of the trough-shaped cage with a spring member having a multiply wound spring leg.

In FIG. 11, the positioning device 122 has a spring member 110*c* having a S-shaped spring leg 126 forming part of the longitudinal wall 115 of the cage 112 and including a curved portion anteriorly of the spring end 133 for support on the end surface 125 of the bearing shell 105. The spring member 110*c* applies an increased counterforce upon the bearing shell as soon as the spring end 133 bears upon the inside of the transverse wall 120.

Figure 12:
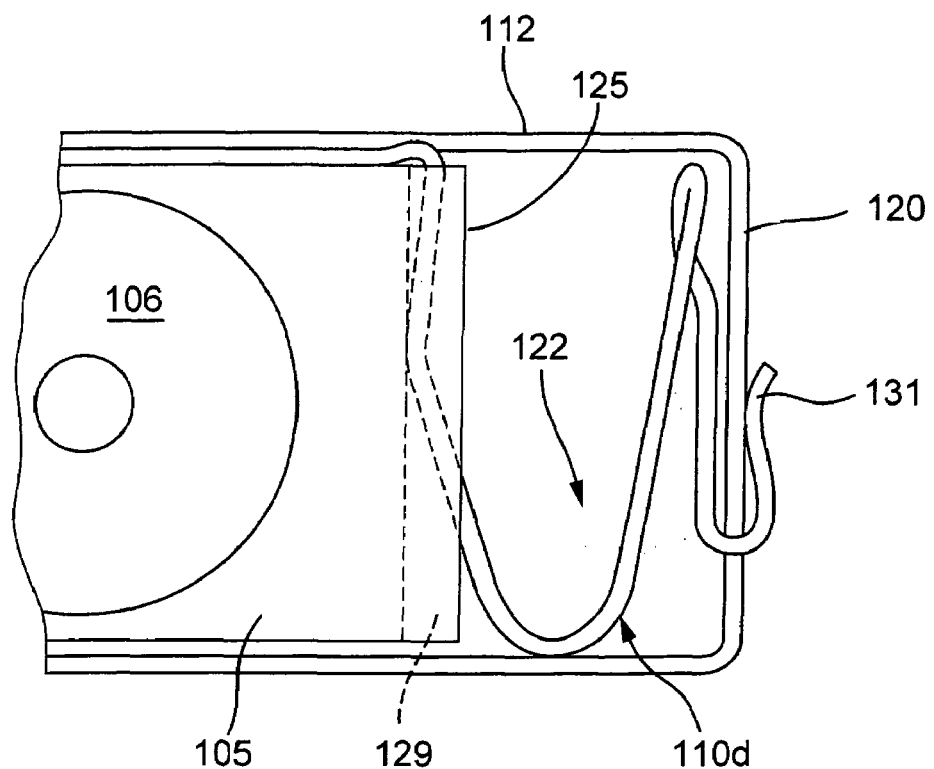
FIG. 12 is a detailed view of another variation of a spring member in the form of a single-piece torsion spring for securement to a bearing shell.
Figure 13:
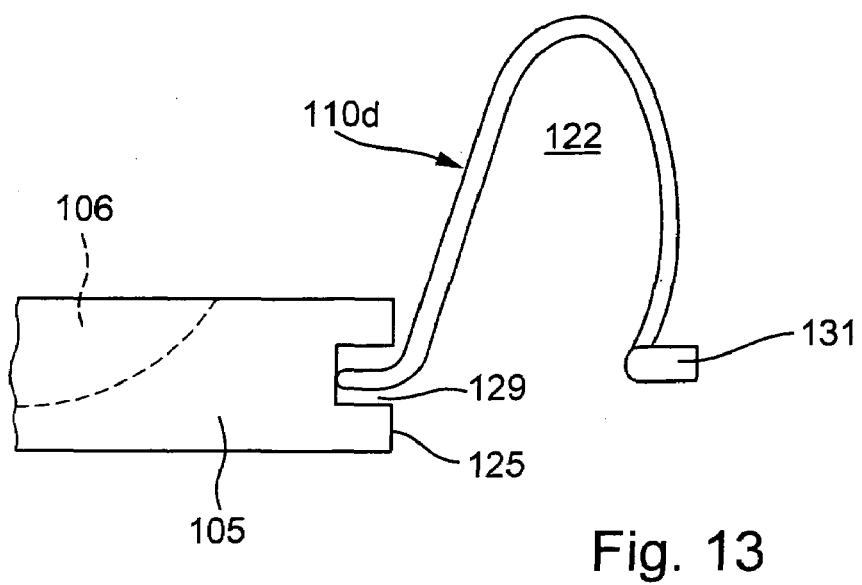
FIG. 13 is a side view of the torsion spring.

The positioning device 122 according to FIG. 12 includes a spring member 110*d* in the form of a single-piece torsion spring having spring ends 131 respectively fixed to the transverse walls 120 of the cage 112. The spring member 110*d* partially fitted and secured in place in a transverse groove 129 of the bearing shell 105 forms a greatly projecting arch, as shown in FIG. 13. This configuration positively affects the load upon the spring member 110*d* during adjustment movements of the bearing shell 105 in correspondence to a torsion spring.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A displacement joint, comprising:
   an outer joint part having circumferentially spaced recesses to form tracks;
   a tripod mounted in fixed rotative engagement to a driveshaft and including a tripod spider which has spherical tripod arms spaced circumferentially in symmetric disposition for engagement in the recesses; and
   roller bearing assemblies fitted in the outer joint part for support of the tripod arms, with each tripod arm being guided by two of said roller bearing assemblies in parallel tracks, each of the roller bearing assemblies having a bearing shell, which receives the tripod arm, a concave receptacle for the tripod arm, rolling members disposed between the track of the outer joint part and an outer side of the bearing shell, a cane having a trough-shaped configuration and made through a process without material removal for guiding the rolling members and the bearing shell, and a positioning device for the bearing shell, wherein the tripod arm has an outer contour of a convexity which does not complement the concavity of the receptacle so as to define a gap area between the tripod arm and the receptacle of the bearing shell.

2. The displacement joint of claim 1, wherein the bearing shell is made by an extrusion process.

3. The displacement joint of claim 1, wherein the tripod arm of the tripod spider is supported via a circular ring shaped contact surface in the bearing shell.

4. The displacement joint of claim 1, wherein each of the roller bearing assemblies is guided in the track of the outer joint part, with the track being bounded in axial direction on an outer side by a shoulder of the outer joint part and configured without steps on an inner side in a direction toward a center of the tripod spider.

5. The displacement joint of claim 1, wherein the rolling members, the cage, the bearing shell and the positioning device are combined to form a unitary structure.

6. The displacement joint of claim 1, wherein the bearing shell is supported by the rolling members via a rectangular or square contact surface and tapers from the contact surface on all sides for formation of a truncated cone or truncated pyramid having a cap-shaped receptacle for the tripod arm at a location distal to the contact surface.

7. The displacement joint of claim 1, wherein the rolling members are placed in axial spaced-apart relationship in the cage, said cage being made through a deep-drawing process and having a cage bottom having pockets, separated by webs, for receiving the rolling members.

8. The displacement joint of claim 7, wherein the webs of the cage are formed in a central area with a recessed zone toward the bearing shell, said recessed zone extending beyond a midsection of the rolling members and configured so as to establish between the webs an axial distance which is smaller than a diameter of the rolling members.

9. The displacement joint of claim 7, wherein the cage bottom has at least one embossment extending over an entire length of the cage and provided with pockets for the rolling members.

10. The displacement joint of claim 1, wherein the positioning device has a spring member in forced engagement with an end surface of the bearing shell, regardless of a direction of movement of the bearing shell.

11. The displacement joint of claim 10, wherein the spring member has at least one spring leg and effects at least one two-stage force-fitting support of the bearing shell.

12. The displacement joint of claim 10, wherein the cage has a transverse wall configured to have first and second spring legs to form the spring member, with the first spring leg being longer than the second spring leg, wherein the first spring leg is supported upon the bearing shell, and the second spring leg becomes effective as the bearing shell shifts.

13. The displacement joint of claim 12, wherein the cage and the spring member are of single-piece configuration.

14. The displacement joint of claim 10, wherein the cage has a transverse wall formed with a multiple angled or wound spring leg having an end portion for support on the end surface of the bearing shell and resting upon a rigid edge or stop of the cage after a defined adjustment movement of the bearing shell.

15. The displacement joint of claim 10, wherein the spring member is a single-piece torsion spring secured to the bearing shell in a force-fitting or form-fitting manner and having spring ends for support against a transverse wall of the cage.

16. The displacement joint of claim 1, wherein the receptacle has an ogival configuration.

17. The displacement joint of claim 1, wherein the rolling members are positioned in the cage separated from one another by webs.

* * * * *